United States Patent
Kato et al.

(10) Patent No.: US 9,291,396 B2
(45) Date of Patent: Mar. 22, 2016

(54) HEADER TANK FOR HEAT EXCHANGER

(75) Inventors: Masahiro Kato, Saitama (JP); Takashi Kaneda, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 502 days.

(21) Appl. No.: 13/640,617

(22) PCT Filed: Apr. 15, 2011

(86) PCT No.: PCT/JP2011/059377
§ 371 (c)(1),
(2), (4) Date: Oct. 11, 2012

(87) PCT Pub. No.: WO2011/132608
PCT Pub. Date: Oct. 27, 2011

(65) Prior Publication Data
US 2013/0025838 A1    Jan. 31, 2013

(30) Foreign Application Priority Data
Apr. 23, 2010 (JP) ................... 2010-099776
Apr. 4, 2011 (JP) ................... 2011-082648

(51) Int. Cl.
*F28F 9/02* (2006.01)
*F28D 1/053* (2006.01)
*F02B 29/04* (2006.01)
*F28D 21/00* (2006.01)

(52) U.S. Cl.
CPC ........ *F28D 1/05366* (2013.01); *F02B 29/0456* (2013.01); *F28F 9/0224* (2013.01); *F28F 9/0268* (2013.01); *F28D 2021/0082* (2013.01); *F28F 2009/029* (2013.01); *F28F 2009/0292* (2013.01); *Y02T 10/146* (2013.01)

(58) Field of Classification Search
CPC ........... F28D 1/05391; F28D 1/05366; F28D 2021/0082; F28F 9/0268; F28F 9/026; F28F 9/0265; F02B 29/0456
USPC ........................................ 165/173, 174, 175
See application file for complete search history.

(56) References Cited

U.S. PATENT DOCUMENTS

| 5,067,561 | A | * | 11/1991 | Joshi et al. ................... 165/140 |
| 5,607,012 | A | * | 3/1997 | Buchanan et al. ............. 165/173 |
| 6,116,335 | A | * | 9/2000 | Beamer et al. ................ 165/174 |
| 7,121,329 | B2 | * | 10/2006 | Shields et al. ................ 165/149 |

FOREIGN PATENT DOCUMENTS

| JP | 62-156287 | U | 10/1987 |
| JP | 07-243790 | A | 9/1995 |
| JP | 2000-013066 | A | 1/2000 |
| JP | 2002-310593 | A | 10/2002 |

* cited by examiner

*Primary Examiner* — Marc Norman
*Assistant Examiner* — Jon T Schermerhorn
(74) *Attorney, Agent, or Firm* — Foley & Lardner LLP

(57) ABSTRACT

A header tank for a heat exchanger for supplying a heat exchange fluid to a core unit in which a plurality of tubes are provided side by side includes an inlet part for introducing the heat exchange fluid into the header tank, and a plurality of ribs projecting into the header tank, extending in directions intersecting with a central axis direction of the inlet part, arranged side by side in the central axis direction and configured to cause the heat exchange fluid to flow into the tubes. The plurality of ribs project more into the header tank with increasing distance from the inlet part.

5 Claims, 11 Drawing Sheets

HEADER TANK FOR HEAT EXCHANGER

TECHNICAL FIELD

The present invention relates to a header tank for a heat exchanger.

BACKGROUND ART

It is previously disclosed in JP2000-13066A that a header tank of a heat exchanger is provide with ribs so that a heat exchange fluid runs through tubes of the heat exchanger.

SUMMARY OF INVENTION

However, in the above invention, there is a problem that less heat exchange fluid is supplied to the back side of the ribs formed to block the flow of the heat exchange fluid, the flow rate of the heat exchange fluid flowing into the tubes on the back side of the ribs decreases and the flow rate of the heat exchange fluid flowing into each tube cannot be made uniform.

The present invention was developed to solve such a problem and aims to make the flow rate of a heat exchange fluid flowing into each tube uniform.

A header tank for a heat exchanger according to one aspect of the present invention is a header tank for an heat exchanger for supplying a heat exchange fluid to a core unit in which a plurality of tubes are provided side by side and includes an inlet part for introducing the heat exchange fluid into the header tank, and a plurality of ribs projecting into the header tank, extending in directions intersecting with a central axis direction of the inlet part, arranged side by side in the central axis direction and configured to cause the heat exchange fluid to flow into the tubes. The plurality of ribs project more into the header tank with increasing distance from the inlet part.

According to the above aspect, the flow rate of the heat exchange fluid flowing into each tube of the heat exchanger can be made uniform.

Embodiments and advantages of the present invention are described in detail below with reference to the accompanying drawings.

EMBODIMENTS OF INVENTION

Figure 1:
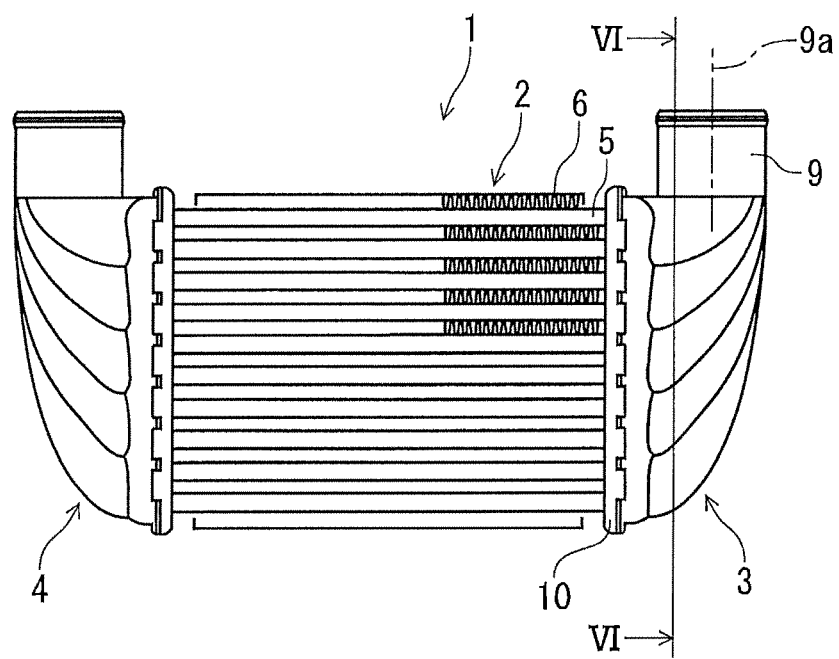
FIG. 1 is a front view of an intercooler of a first embodiment.
Figure 2:
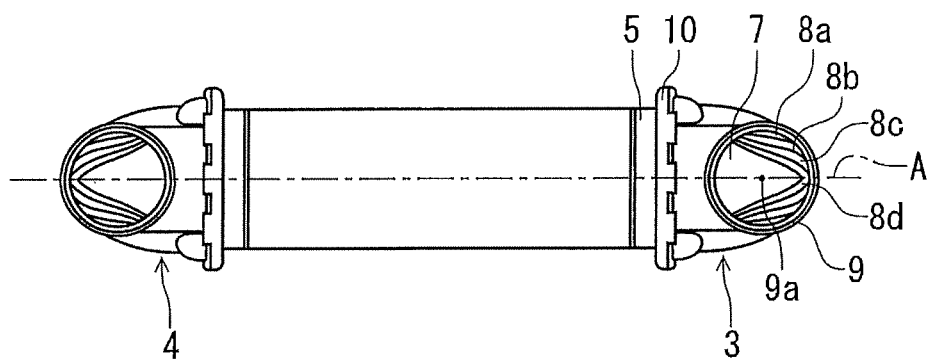
FIG. 2 is a plan view of the intercooler of the first embodiment.

The configuration of a first embodiment of the present invention is described using FIG. 1. A header tank of a heat exchanger is described taking a header tank of an intercooler as an example in this embodiment but, without being limited to this, it can be also used as a header tank of a radiator or the like. FIG. 1 is a front view of an intercooler of this embodiment. FIG. 2 is a plan view of the intercooler of this embodiment.

The intercooler 1 of this embodiment includes a core unit 2 for heat exchange with a heat exchange fluid, a first header tank 3 from which the heat exchange fluid is introduced into the core unit 2 and a second header tank 4 into which the heat exchange fluid is discharged from the core unit 2.

The core unit 2 includes a plurality of tubes 5 into which the heat exchange fluid flows, and a plurality of fins 6.

The tubes 5 extend in a horizontal direction and arranged side by side in a vertical direction, and the fins 6 are arranged between adjacent tubes 5. The high-temperature heat exchange fluid flows into each tube 5. After being cooled through heat exchange with outside air in the core unit 2, the heat exchange fluid is discharged from each tube 5 to the second header tank 4. Note that only some of the fins 6 are shown in FIG. 1. The tubes 5 extend in the horizontal direction and are arranged side by side in the vertical direction in this embodiment but, without being limited to this, they may be arranged side by side, for example, in the horizontal direction.

Figure 3:
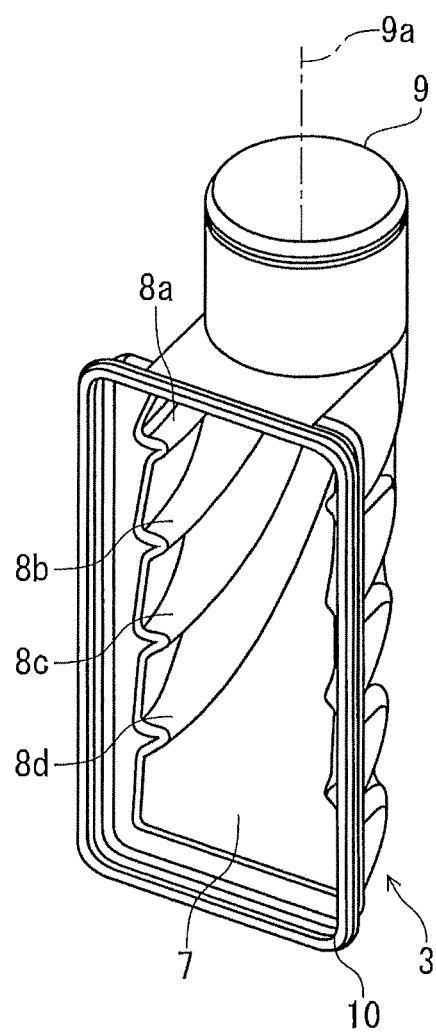
FIG. 3 is a perspective view of a first header tank of the first embodiment.
Figure 4:
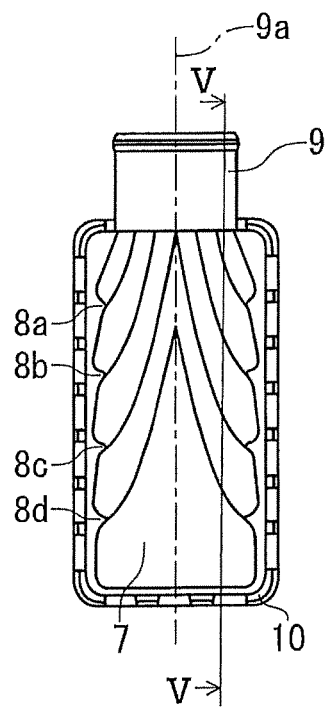
FIG. 4 is a side view of the first header tank of the first embodiment when viewed from front.

Next, the first header tank 3 is described with reference to FIGS. 3 and 4. FIG. 3 is a perspective view of the first header tank 3. FIG. 4 is a side view of the first header tank 3 when viewed from front.

The first header tank 3 is formed with a chamber 7 into which the heat exchange fluid is to be introduced. The first header tank 3 includes a plurality of ribs 8a to 8d for causing the heat exchange fluid to flow into the tubes 5, an inlet part 9 for introducing the heat exchange fluid into the chamber 7, and a flange 10 used to mount the first header tank 3 to the core unit 2. The first header tank 3 is curved to gradually reduce a distance to the tubes 5 as it extends vertically downward.

The inlet part 9 is cylindrically formed and introduces the heat exchange fluid into the chamber 7 from above the chamber 7. Note that an axial direction of a central axis 9a of the inlet part 9 coincides with the vertical direction in this embodiment but, without being limited to this, the axial direction may be inclined with respect to the vertical direction.

The ribs 8a to 8d are formed by causing an inner wall of the first header tank 3 to project toward the chamber 7. Further, the ribs 8a to 8d extend in directions intersecting with a central axis direction of the inlet part 9 and are arranged side by side in the central axis direction. That is, surfaces of the ribs 8a to 8d are arranged to intersect with the central axis direction of the inlet part 9. Each rib 8a to 8d is composed of two ribs plane-symmetric with respect to a plane A including a central axis of the inlet part 9 and passing substantially through a center of the first header tank 3. Note that the plane A is a plane passing through the central axis 9a of the inlet part 9 and central axes of the tubes 5.

Figure 5:
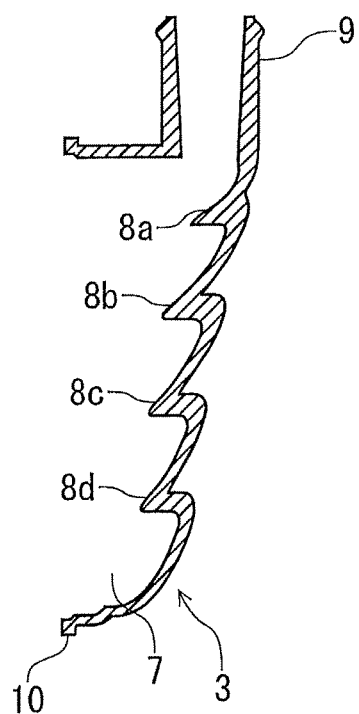
FIG. 5 is a sectional view along V-V of FIG. 4.

The ribs 8a to 8d are curved from the upper side to the lower side in the vertical direction as shown in FIG. 1 and change a flowing direction of the heat exchange fluid coming into contact with the ribs 8a to 8d and cause the heat exchange fluid to flow into the tubes 5 corresponding to the ribs 8a to 8d respectively. The vertically lower ones of the ribs 8a to 8d cause the heat exchange fluid to flow into the vertically lower tubes 5. Note that the ribs 8a to 8d may have flat surfaces perpendicular to a longitudinal direction of the central axis 9a of the inlet part 9 and a lamination direction of the tubes 5 and the fins 6 without being curved The ribs 8a to 8d project more toward the tubes 5 with increasing distance from the inlet part 9 as shown in FIG. 5. FIG. 5 is a sectional view along V-V of FIG. 4.

Figure 6:
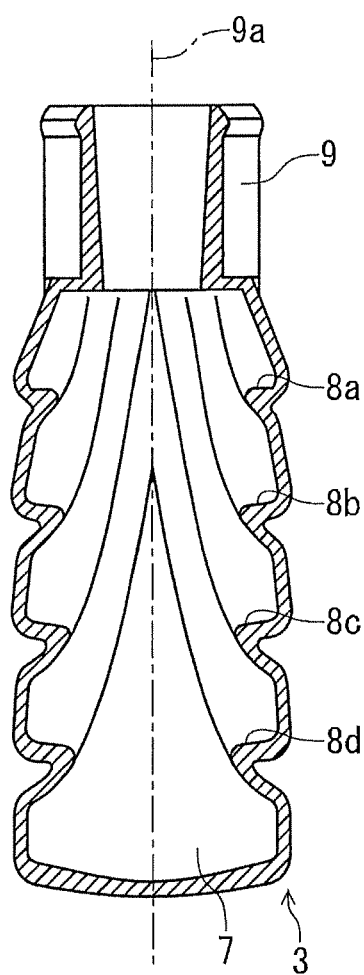
FIG. 6 is a sectional view along VI-VI of FIG. 1.

Further, the ribs 8a to 8d project more toward an inner wall side of the first header tank 3 facing the inner wall of the first header tank 3, from which the ribs 8a to 8d project, with increasing distance from the inlet part 9 as shown in FIG. 6. In this embodiment, the ribs 8a to 8d project more toward the plane A with increasing distance from the inlet part 9. FIG. 6 is a sectional view along VI-VI of FIG. 1.

That is, the ribs 8a to 8d project more toward the chamber 7 of the first header tank 3 with increasing distance from the inlet part 9.

Note that the ribs 8a to 8d may be caused to project toward the chamber 7 of the first header tank 3 by increasing the projecting amounts of the ribs themselves or may be caused to project toward the chamber 7 of the first header tank 3 by curving the first header tank 3 toward the tubes 5. That is, the ribs 8a to 8d only have to be so formed that end parts (edges) thereof are located at the chamber 7 side of the first header tank 3 with increasing distance from the inlet part 9.

As being located more vertically upward, the ribs 8a to 8d are more distant from the plane A. For example, in the uppermost rib 8a and the rib 8b one below the rib 8a, end parts of the ribs 8a, 8b located at the inlet part 9 side are not arranged on a line of intersection between the plane A and the first header tank 3 and facing the tubes 5. Thus, the heat exchange fluid flowing near this line of intersection is caused to flow into the vertically lower tubes 5 by the vertically lower ribs 8c, 8d.

The ribs 8a to 8d are provided in correspondence with the tubes 5. In this embodiment, each rib 8a to 8d is provided to cause the heat exchange fluid to flow into two tubes 5. However, without being limited to this, one rib may cause the heat exchange fluid to flow into one, three or more tubes 5. Further, pitches between the ribs may be made narrower or may be made wider, for example, toward the vertically upper side.

Note that although the outer wall of the first header tank 3 is indented in conformity with the shapes of the ribs 8a to 8d, the first header tank 3 may be formed without being indented. Further, the ribs 8a to 8d may be formed of members different from the first header tank 3 and may be arranged in the first header tank 3.

The second header tank 4 is configured similarly to the first header tank 3 and discharges the heat exchange fluid from a discharge unit 11. Note that the second header tank 4 may be configured differently from the first header tank 3.

Next, functions of the first embodiment are described.

Figure 7:
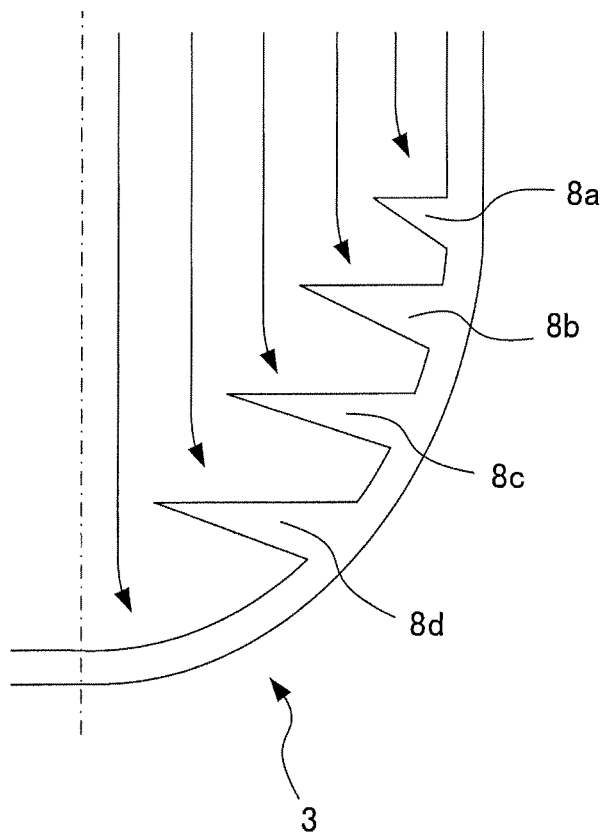
FIG. 7 is a diagram showing the flow of a heat exchange fluid in the first embodiment.

The flow of the heat exchange fluid when the heat exchange fluid is introduced into the first header tank 3 through the inlet part 9 is described using FIG. 7. FIG. 7 is a diagram showing the flow of the heat exchange fluid in FIG. 5.

Out of the heat exchange fluid having flowed into the first header tank 3, the heat exchange fluid distant from the tubes 5 collides with the uppermost rib 8a in the vertical direction to have the flowing direction changed by the rib 8a and flows into the tubes 5 corresponding to the rib 8a along the rib 8a. The heat exchange fluid closer to the tubes 5 than the heat exchange fluid caused to flow into the tubes 5 by the rib 8a collides with the rib 8b to have the flowing direction changed by the rib 8b and flows into the tubes 5 corresponding to the rib 8b along the rib 8b. The heat exchange fluid even closer to the tubes 5 is caused to flow into the corresponding tubes 5 by the rib 8c or the rib 8d.

In this way, as approaching the tubes 5, the heat exchange fluid collides with the vertically lower ribs and is caused to flow into the vertically lower tubes 5 corresponding to the vertically lower ribs by the vertically lower ribs. That is, the ribs on the back side of the vertically upper ribs project more toward the tubes 5 than the vertically upper ribs, whereby the ribs on the back side cause the heat exchange fluid to flow into the tubes 5 corresponding to the ribs on the back side.

Note that although the ribs 8a to 8d are provided to be symmetry with respect to the plane A in this embodiment, they may be provided to be asymmetric with respect to the plane A, e.g. the ribs at the right side of the plane A and those at the left side in FIG. 6 may be shifted. This enables the flow rate of the heat exchange fluid flowing into each tube 5 to be adjusted without narrowing the pitches between the ribs.

Further, although the ribs 8a to 8d project more toward the tubes 5 and more toward the plane A with increasing distance from the inlet part 9 in this embodiment, they may be ribs projecting toward either one of them. Further, each rib 8a to 8d may be one rib or one continuous rib without being composed of two ribs.

Effects of the first embodiment of the present invention are described.

In this embodiment, the ribs 8a to 8d projecting into the first header tank 3 are provided to project more into the first header tank 3 as they are located more vertically downward, i.e. with increasing distance from the inlet part 9. For example, the ribs 8a to 8d are provided to project more toward the tubes 5 and more toward the inner wall side facing the inner wall of the first header tank 3, from which the ribs 8a to 8d project, with increasing distance from the inlet part 9. This enables each rib 8a to 8d to cause the heat exchange fluid to flow into the tubes corresponding to the rib 8a to 8d. This can suppress a reduction in the flow rate of the heat exchange fluid flowing into the vertically lower tubes 5, i.e. tubes 5 on the back side of a certain rib and can make the flow rate of the heat exchange fluid flowing into each tube 5 uniform.

Since the ribs 8a to 8d are provided to be more distant from the plane A as they are located more vertically upward, the end parts of the vertically upper ribs 8a, 8b are not provided on the line of intersection between the plane A and the first header tank 3. Thus, the heat exchange fluid flowing near this line of intersection can be caused to flow into the vertically lower tubes 5 by the vertically lower ribs 8c, 8d and the flow rate of the heat exchange fluid flowing into each tube 5 can be made uniform.

Next, a second embodiment of the present invention is described with reference to FIGS. 8 and 9.

Figure 8:
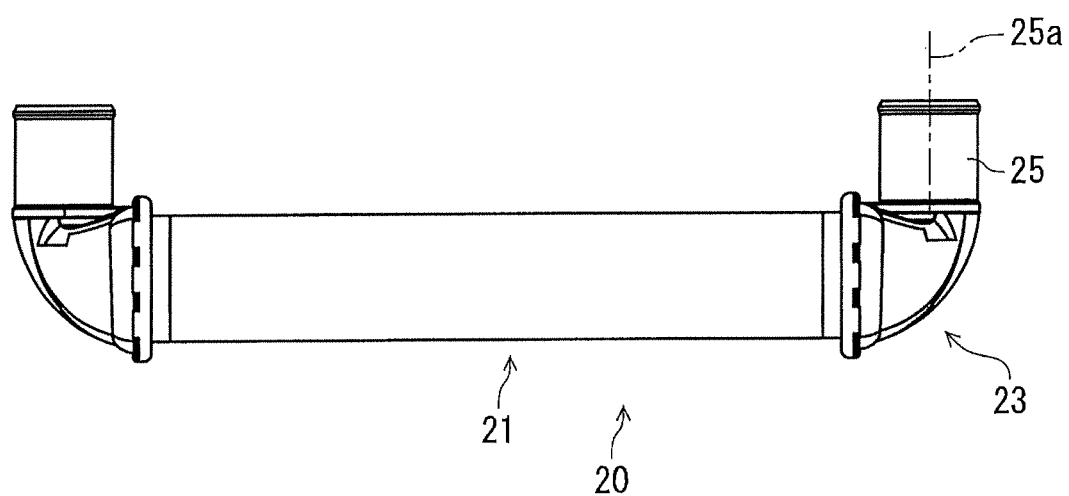
FIG. 8 is a front view of an intercooler of a second embodiment.
Figure 9:
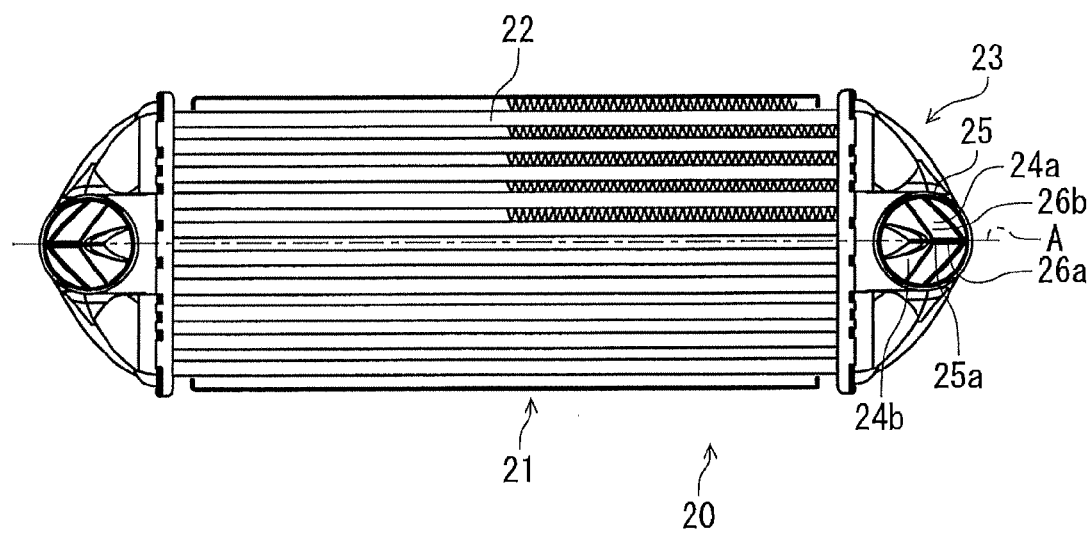
FIG. 9 is a plan view of the intercooler of the second embodiment.

FIG. 8 is a front view of an intercooler of this embodiment. FIG. 9 is a plan view of the intercooler of this embodiment. Here, description is centered on points different from the first embodiment.

In a core unit 21 of the intercooler 20, tubes 22 are arranged side by side in a horizontal direction. That is, the tubes 22 are arranged side by side in a direction intersecting with a central axis 25a of an inlet part 25, in this embodiment, in a direction perpendicular to the central axis 25a.

Figure 10:
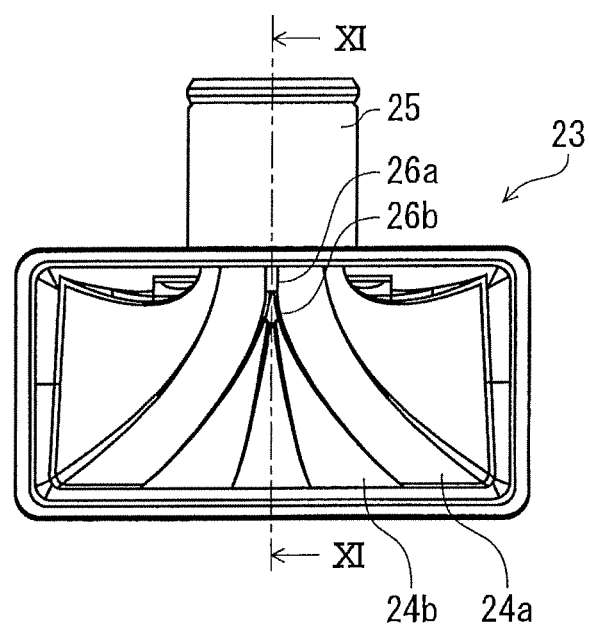
FIG. 10 is a side view of a first header tank of the second embodiment when viewed from front.
Figure 11:
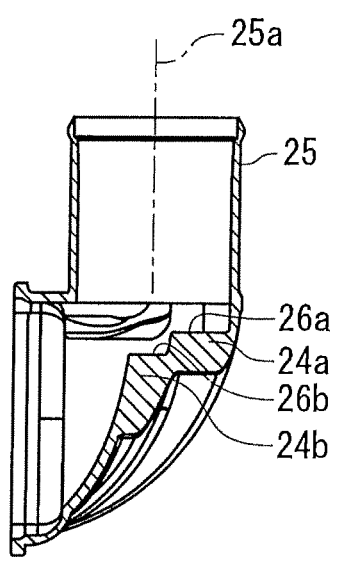
FIG. 11 is a sectional view XI-XI of FIG. 10.

A first header tank 23 is further described using FIGS. 10 and 11.

FIG. 10 is a side view of the first header tank 23 when viewed from front. FIG. 11 is a sectional view along XI-XI of FIG. 10.

The first header tank 23 includes a plurality of ribs 24a, 24b. The ribs 24a, 24b project more toward the tubes 22 with increasing distance from the inlet part 25. Out of the ribs 24a, 24b, the vertically lower rib 24b causes more heat exchange fluid to flow into the tubes 22 at a central side. That is, the vertically upper rib 24a causes the heat exchange fluid to flow into the tubes 22 at outer sides.

The rib 24a includes a projection 26a projecting toward the inlet part 25 near a position where a plane A and the first header tank 23 are in contact. The projection 26a is formed along the plane A and has a tapered shape widened from the ridge thereof toward a vertically lower side. The rib 24b similarly includes a projection 26b.

As shown in FIG. 11, the ribs 24a and 24b are formed in a stepwise manner and the heat exchange fluid can be caused to reliably flow into the tubes 22 by the ribs 24a and 24b.

Functions of this embodiment are described.

Out of the heat exchange fluid having flowed into the first header tank 23, the heat exchange fluid distant from the tubes 22 collides with the rib 24a located at the vertically upper side to have the flowing direction changed by the rib 24a and flows into the tubes 22 at the outer sides along the rib 24a. Further, the heat exchange fluid closer to the tubes 22 than the fluid colliding with the rib 24a collides with the rib 24b located at the vertically lower side than the rib 24a to have the flowing direction changed by the rib 24b and flows into the tubes 22 at the inner side than the tubes 22, into which the heat exchange fluid flows, along the rib 24b.

Further, the heat exchange fluid flows uniformly in a lateral direction with respect to the plane A by the presence of the projections 26a, 26b provided on the ribs 24a, 24b.

Note that although the rib 24a, 24b of this embodiment is one continuous rib, it may be composed of two ribs as in the first embodiment.

Effects of this embodiment are described.

Even if the tubes 22 are arranged side by side in the horizontal direction, the flow rate of the heat exchange fluid flowing into each tube 22 can be made uniform.

By providing the ribs 24a, 24b with the projections 26a, 26b, the heat exchange fluid having collided with the ribs 24a, 24b can be caused to flow uniformly in the lateral direction. Further, by forming the projections 26a, 26b into a tapered shape, the heat exchange fluid can be caused to smoothly flow into each tube 22 along the ribs 24a, 24b.

Although the embodiments of the present invention have been described above, the above embodiments merely indicate some of application examples of the present invention and are not of the nature to limit the technical scope of the present invention to the specific configurations of the above embodiments.

The present application claims a priority based on Japanese Patent Application No. 2010-99776 filed with the Japan Patent Office on Apr. 23, 2010 and Japanese Patent Application No. 2011-82648 filed with the Japan Patent Office on Apr. 4, 2011, all the contents of which are hereby incorporated by reference.

The invention claimed is:

1. A header tank for a heat exchanger for supplying a heat exchange fluid to a core unit in which a plurality of tubes are provided side by side, comprising:
    an inlet part arranged to introduce the heat exchange fluid into the header tank; and
    a plurality of pairs of ribs projecting into the header tank, extending from left and right inner walls to an opening of a tube side in directions intersecting with a central axis direction of the inlet part, arranged side by side in the central axis direction and configured to cause the heat exchange fluid to flow into the tubes;
    wherein the plurality of pairs of ribs project more into the header tank as a distance of the ribs from the inlet part increases.

2. The header tank for the heat exchanger according to claim 1, wherein:
    the plurality of pairs of ribs project toward the tubes.

3. The header tank for the heat exchanger according to claim 1, wherein:
    a distance between the ribs and a plane including a central axis of the inlet part and passing through a center of the header tank increases as the distance of the ribs from the inlet part decreases.

4. The header tank for the heat exchanger according to claim 1, wherein:
    the plurality of tubes are provided side by side in a direction intersecting with a central axis of the inlet part; and
    the plurality of pairs of ribs cause the heat exchange fluid to flow into the tubes located at outer sides as the distance of the ribs from the inlet part increases.

5. The header tank for the heat exchanger according to claim 4, wherein:
    the pairs of ribs respectively include a projection projecting from the header tank toward the inlet part.

* * * * *